(12) United States Patent
Watanabe

(10) Patent No.: US 10,041,581 B2
(45) Date of Patent: Aug. 7, 2018

(54) PLANETARY ROLLER POWER TRANSMISSION DEVICE

(71) Applicant: JTEKT CORPORATION, Osaka-shi, Osaka (JP)

(72) Inventor: Hajime Watanabe, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 121 days.

(21) Appl. No.: 15/198,462

(22) Filed: Jun. 30, 2016

(65) Prior Publication Data
US 2017/0009873 A1    Jan. 12, 2017

(30) Foreign Application Priority Data
Jul. 6, 2015    (JP) .................................. 2015-135213

(51) Int. Cl.
*F16H 57/04*    (2010.01)
*F16H 13/06*    (2006.01)

(52) U.S. Cl.
CPC ......... *F16H 57/0486* (2013.01); *F16H 13/06* (2013.01); *F16H 57/043* (2013.01); *F16H 57/0464* (2013.01); *F16H 57/0487* (2013.01)

(58) Field of Classification Search
CPC .... F16H 57/0486; F16H 13/06; F16H 57/043; F16H 57/0464; F16H 57/0487; F16H 1/2827; F16H 57/082
See application file for complete search history.

(56) References Cited

U.S. PATENT DOCUMENTS 3,960,029 A * 6/1976 Eichinger ............... F16H 1/227
                                                  184/6.12
2016/0238107 A1* 8/2016 Hirota ..................... F16D 28/00

FOREIGN PATENT DOCUMENTS

DE            812749 C   * 9/1951  ......... F16H 57/0427
JP         07145856 A   * 6/1995  ......... F16H 57/0406
JP         3104006 B2   10/2000

\* cited by examiner

*Primary Examiner* — Stacey A Fluhart
(74) *Attorney, Agent, or Firm* — Oliff PLC

(57) ABSTRACT

A planetary roller power transmission device includes: a stationary ring; a sun shaft; planetary rollers provided between the stationary ring and the sun shaft so as to be pressed against them; a carrier that supports the planetary rollers so that the planetary rollers are rotatable and that rotates in conjunction with revolution of the planetary rollers; and a disk-shaped support plate supporting an oil-containing member that can be in contact with a peripheral surface of each planetary roller. Axial free movement of the support plate is restricted by the planetary rollers and the sun shaft or a member that is integrated with the sun shaft so as to be integrally rotatable. The support plate is structured so as to be rotatable relatively to the sun shaft in conjunction with rotation of the sun shaft due to contact with the sun shaft or the member.

7 Claims, 10 Drawing Sheets

PLANETARY ROLLER POWER TRANSMISSION DEVICE

INCORPORATION BY REFERENCE

The disclosure of Japanese Patent Application No. 2015-135213 filed on Jul. 6, 2015 including the specification, drawings and abstract, is incorporated herein by reference in its entirety.

BACKGROUND OF THE INVENTION

1. Field of the Invention

The invention relates to a planetary roller power transmission device. More specifically, the present invention relates to a planetary roller power transmission device that uses an oil-containing member to lubricate the interior of the device.

2. Description of Related Art

Conventionally, planetary roller power transmission devices have been used for a paper feeding mechanism of printers, for example, because rotational speed thereof is more uniform than that of planetary-gear-type power transmission devices, and power of motors can be transmitted with high precision. In a planetary roller power transmission device, power is sequentially transmitted by friction among a sun shaft, planetary rollers, and a stationary ring that are made of metal. As lubricant for preventing seizure of members due to friction between metals, grease is commonly used.

However, after a device has been used for a certain period, grease may leak from the device, whereby the grease may be depleted. If grease has been depleted, friction between metals is generated, which causes seizure to reduce the lifespan of the device. In view of this, it is proposed that an oil-containing roller formed by mixing synthetic resin powder with oil and baking the resulting mixture in a roller shape is used with grease to increase the lifespan of a device (see Japanese Patent No. 3104006 (JP 3104006 B), for example).

As depicted in FIGS. 7 and 8, a planetary roller power transmission device 50 described in the specification of JP 3104006 B includes a stationary ring 52, a sun shaft 53, a plurality of planetary rollers 54, and a carrier 55. The stationary ring 52 is fixed to a housing 51. The sun shaft 53 is disposed concentrically with the stationary ring 52 inside the stationary ring 52. The planetary rollers 54 are provided between the sun shaft 53 and the stationary ring 52 so as to be pressed against the sun shaft 53 and the stationary ring 52. The carrier 55 supports the planetary rollers 54 so that the planetary rollers 54 are rotatable and the carrier 55 rotates in conjunction with revolution of the planetary rollers 54.

Between the adjacent planetary rollers 54, oil-containing rollers 56 that are in contact with the planetary rollers 54 are each disposed. The respective oil-containing rollers 56 are rotatably supported by support shafts 58 provided so as to protrude on peripheral portions of a support body 57 that is provided at an end surface of the carrier 55 separately from the carrier 55.

As depicted in FIG. 9, between the adjacent support shafts 58 at outer peripheral portions of the support body 57, engagement recessed portions 60 are formed that engage with roller shafts 59 supporting the planetary rollers 54 so that the planetary rollers 54 are rotatable. These engagement recessed portions 60 each engage with the corresponding roller shaft 59, and thus the support body 57 can rotate concentrically with the carrier 55.

In the power transmission device 50, when the sun shaft 53 rotates, the planetary rollers 54 revolve while rotating, and the carrier 55 rotates along with this revolution. At this time, because the engagement recessed portions 60 of the support body 57 engage with the roller shafts 59 of the planetary rollers 54, the support body 57 rotates together with the carrier 55. The oil-containing rollers 56 supported by the support shafts 58 of the support body 57 revolve so as to follow the planetary rollers 54, and rotate while being in contact with peripheral surfaces of the planetary rollers 54. Accordingly, oil is supplied from the oil-containing rollers 56 to the planetary rollers 56, whereby oil films are formed on rolling contact surfaces between the planetary rollers 54 and the stationary ring 52. The oil-containing rollers 56 are supported by the support shafts 58, whereby positions thereof in the radial direction can be kept constant. Thus, the oil-containing rollers 56 are not caught between the stationary ring 52 and the planetary rollers 54.

In the power transmission device 50, the width of the engagement recessed portions 60 in the circumferential direction is larger than the diameter of the roller shafts 59, and thus the support body 57 can move by a certain angle in the circumferential direction with respect to the carrier 55. Consequently, the oil-containing rollers 56 supported by the support shafts 58 can move by the certain angle in the revolving direction with respect to the planetary rollers 54. Accordingly, the oil-containing rollers 56 rotate while being appropriately pressed against the planetary rollers 54, so as to supply oil to the planetary rollers 54.

However, in the conventional power transmission device 50, a clearance c (see FIG. 8) between the carrier 55 and the support body 57 is clogged with grease. This grease may cause the support body 57 to adhere to the carrier 55. If the support body 57 has adhered to the carrier 55, there are occasions when the oil-containing rollers 56 cannot be pressed against the planetary rollers 54. Specifically, if the support body 57 has adhered to the carrier 55, the support body 57 and the carrier 55 rotate together. Consequently, the oil-containing rollers 56 positioned by the support body 57 may continue revolving together with the carrier 55 while being positioned apart from the planetary rollers 54 in a non-contact manner as depicted in FIG. 10. In this case, oil cannot be supplied from the oil-containing rollers 56 to the planetary rollers 54, and thus the lifespan of the device cannot be increased.

SUMMARY OF THE INVENTION

An object of the present invention is to provide a power transmission device that can stably supply oil to planetary rollers.

A planetary roller power transmission device (hereinafter, also simply called "power transmission device") according to one aspect of the present invention includes: a stationary ring; a sun shaft disposed inside the stationary ring so as to be concentric with the stationary ring; a plurality of planetary rollers provided between the stationary ring and the sun shaft so as to be pressed against the stationary ring and the sun shaft; a carrier that supports the planetary rollers so that the planetary rollers are rotatable and that rotates in conjunction with revolution of the planetary rollers; and a disk-shaped support plate that supports an oil-containing member configured to be in contact with a peripheral surface of each of the planetary rollers. In the power transmission device, free movement of the support plate in an axial direction is restricted by the planetary rollers and the sun shaft or a member that is integrated with the sun shaft so as to be integrally rotatable. The support plate is structured so as to be rotatable relatively to the sun shaft in conjunction with rotation of the sun shaft due to contact with the sun shaft or the member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of a power transmission device of the present invention will now be described in detail with reference to the accompanying drawings. It should be noted that the present invention is not limited to these examples, and is described by the claims and is intended to contain all modifications within the spirit and the scope equivalent to the claims.

Figure 1:
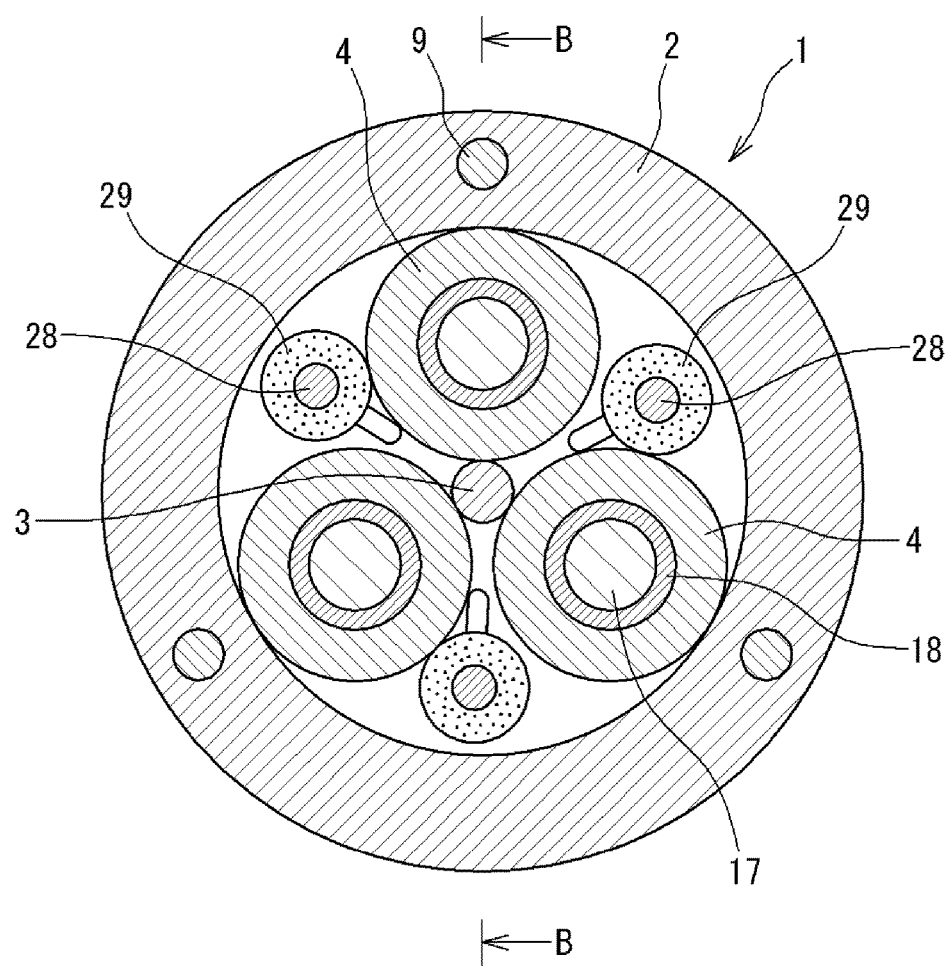
FIG. 1 is a vertical sectional view of a power transmission device according to one embodiment of the present invention.
Figure 2:
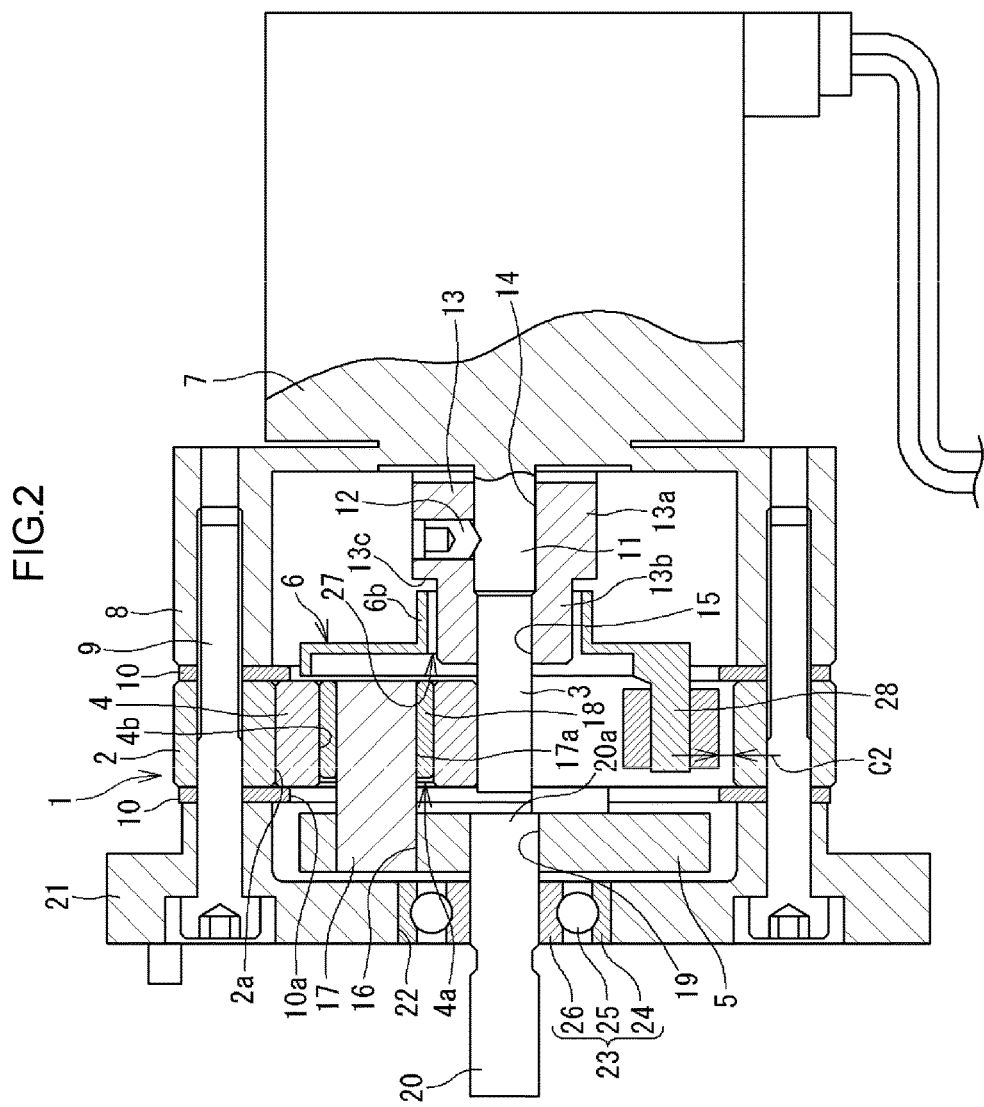
FIG. 2 is a sectional view of the power transmission device depicted in FIG. 1 along line B-B.

FIG. 1 is a vertical sectional view of a power transmission device 1 according to one embodiment of the present invention. FIG. 2 is a sectional view of the power transmission device 1 depicted in FIG. 1 along line B-B. The power transmission device 1 reduces a high speed of rotation output from a motor so as to output the resulting rotational speed. The power transmission device 1 includes a stationary ring 2, a sun shaft 3, a plurality of planetary rollers 4, a carrier 5, and a support plate 6.

The stationary ring 2 is fixed by bolts 9 to a bracket 8 formed on a housing 7 of the motor. The bracket 8 has a cylindrical shape one end of which is open, in which the sun shaft 3 and the support plate 6 are disposed. On both sides of the stationary ring 2 in the axial direction, loose ribs 10 for guiding the planetary rollers 4 are each disposed. An inner periphery 10a of each loose rib 10 slightly protrudes radially inward of an outer peripheral surface 2a of the stationary ring 2 so that movement of the planetary rollers 4 that rotate and revolve is restricted in the axial direction. The loose ribs 10 are fixed to the bracket 8 together with the stationary ring 2 by the bolts 9. The stationary ring 2 can be made of metal such as high carbon-chromium bearing steel. The loose ribs 10 can be made of metal such as tool steel.

To a distal end portion of a motor shaft 11, a cylindrical coupling 13 is fixed by a screw 12. The coupling 13 includes a large-diameter portion 13a and a small-diameter portion 13b. The outside diameter of the large-diameter portion 13a is larger than the outside diameter of the small-diameter portion 13b. The bore diameter of the large-diameter portion 13a is larger than the bore diameter of the small-diameter portion 13b. The motor shaft 11 is inserted into a hole 14 of the large-diameter portion 13a. One end of the sun shaft 3 is press-fitted into a hole 15 of the small-diameter portion 13b. The sun shaft 3 is disposed inside the stationary ring 2 so as to be concentric with the stationary ring 2.

The planetary rollers 4 are disposed between the stationary ring 2 and the sun shaft 3 so as to be pressed against the stationary ring 2 and the sun shaft 3. In the present embodiment, three planetary rollers 4 are disposed at regular intervals in the circumferential direction. The planetary rollers 4 can be made of metal such as high carbon-chromium bearing steel.

The carrier 5 is disposed on one side (left side in FIG. 2) of the planetary rollers 4 in the axial direction, which is opposite from the motor. The carrier 5 has a disk shape, and roller shafts 17 are press-fitted into peripheral holes 16 formed on peripheral portions of the carrier 5. Each roller shaft 17 has a cylindrical shape, and is press-fitted into the corresponding peripheral hole 16 so that part of the roller shaft 17 protrudes in the axial direction. A distal end portion of each roller shaft 17, that is, an end portion thereof protruding in the axial direction is inserted into a hole 4a of the corresponding planetary roller 4 via a plain bearing 18. The plain bearing 18 is disposed between an inner peripheral surface 4b of each planetary roller 4 and an outer peripheral surface 17a of the corresponding roller shaft 17. Into a central hole 19 of the carrier 5, one end portion 20a of an output shaft 20 is press-fitted.

An opening of the bracket 8 is closed by a disk-shaped cover 21. The cover 21 is fixed to the bracket 8 together with the stationary ring 2 and the loose ribs 10 by the bolts 9. A ball bearing 23 is fitted in a central hole 22 of the cover 21. An outer ring 24 of the ball bearing 23 is press-fitted into the central hole 22 of the cover 21. The output shaft 20 is press-fitted in an inner ring 26 provided inside the outer ring 24 with balls 25 interposed therebetween.

Figure 3:
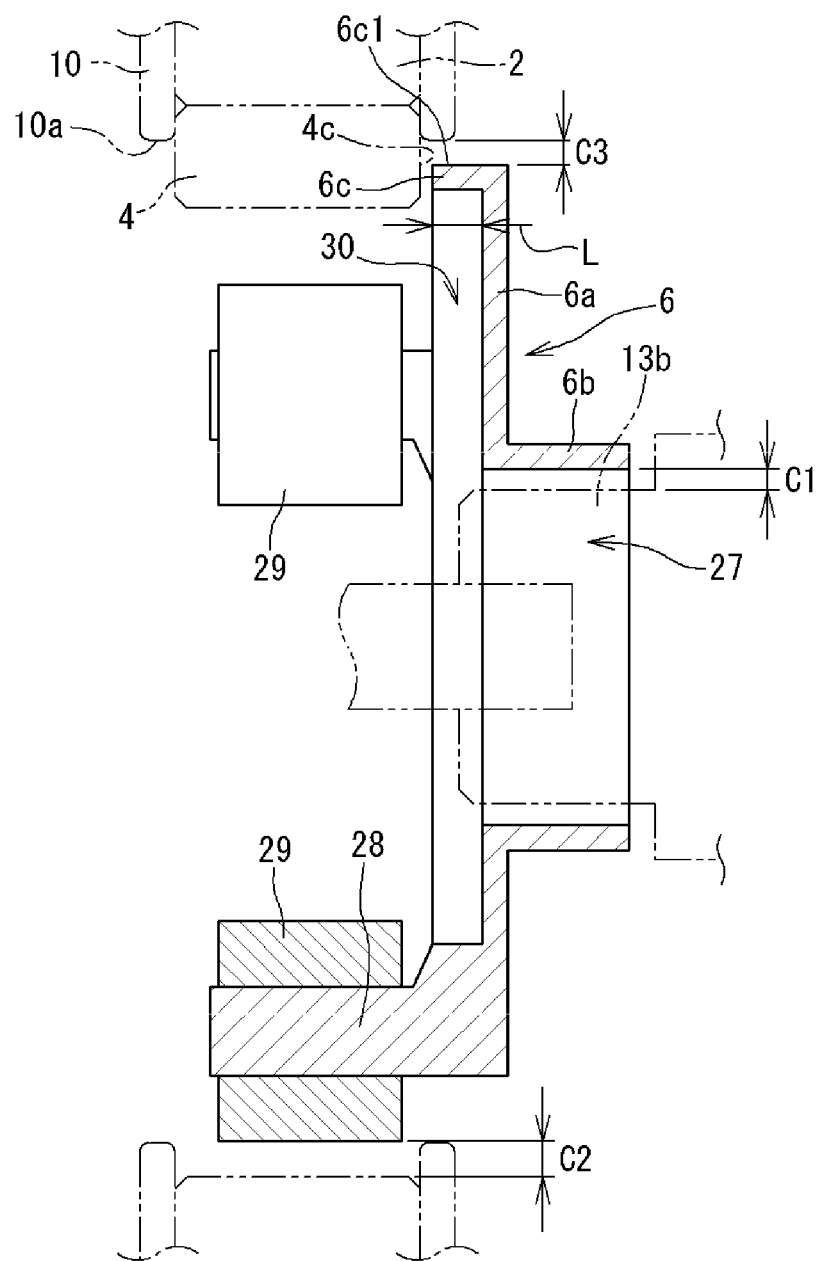
FIG. 3 is a side view of a support plate to which oil-containing rollers are provided.
Figure 4:
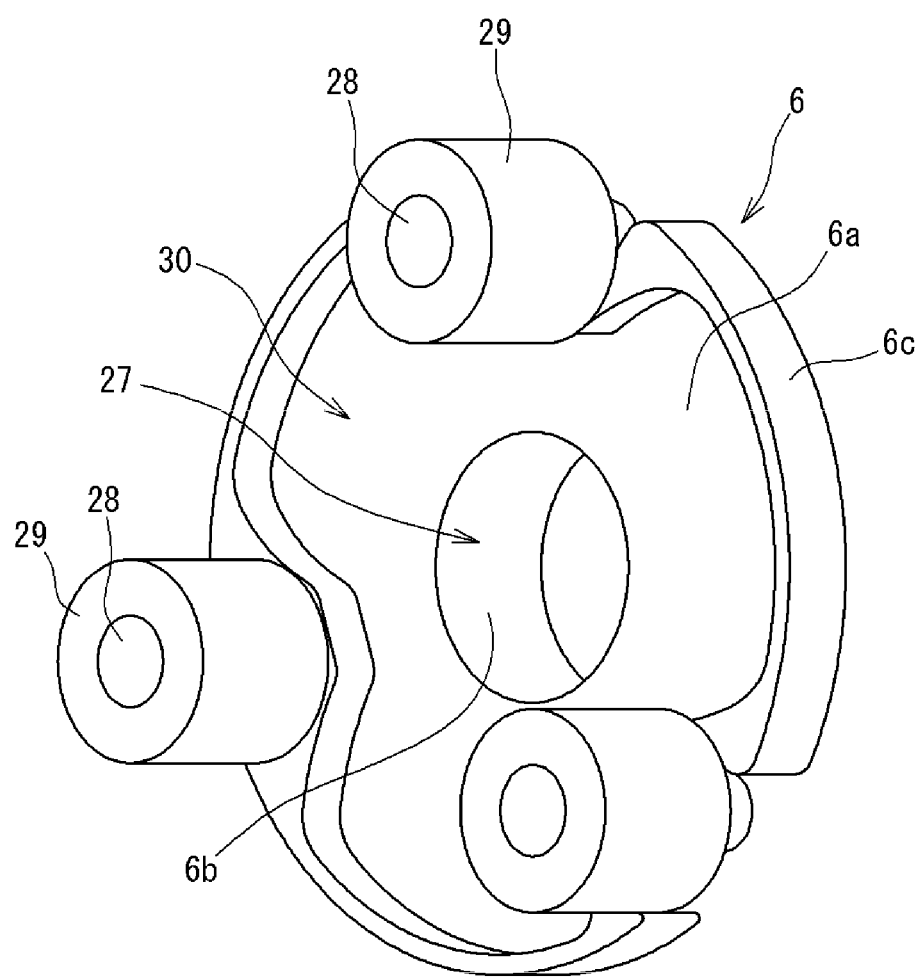
FIG. 4 is a perspective explanatory view of the support plate to which the oil-containing rollers are provided.

The support plate 6 is disposed on the motor side (right side in FIG. 2) of the planetary rollers 4. The support plate 6 includes a main body 6a, a cylindrical portion 6b, and an annular protruding wall 6c. In the center of the main body 6a, a hole (central hole) 27 is formed as depicted in FIGS. 3 and 4. The cylindrical portion 6b extends from an inner peripheral edge of the hole 27 toward one side (right side in FIG. 2) in the axial direction. The protruding wall 6c protrudes from an outer peripheral edge of the main body 6a toward the other side (left side in FIG. 2) in the axial direction. On peripheral portions of a surface of the support plate 6 on the other side in the axial direction, support shafts 28 that support oil-containing rollers described later so that the oil-containing rollers are rotatable are formed, protruding along the axial direction. The support shafts 28 in the present embodiment are formed integrally with the main body 6a of the support plate 6. Alternatively, support shafts that are separated from the main body 6a of the support plate 6 may be fixed to the main body 6a.

The protruding length L of the protruding wall 6c in the axial direction is set so that the protruding wall 6c can come into contact with an end surface 4c of each planetary roller 4. The protruding wall 6c is formed on the outer peripheral edge of the main body 6a, whereby a grease sump 30 having a recessed shape can be formed on a side surface of the support plate 6 closer to the planetary roller 4. By providing this grease sump 30, grease can be retained in the device. This enables grease sticking to the grease sump 30 to be returned to the planetary rollers 4. Consequently, rolling contact surfaces between the planetary rollers 4 and the stationary ring 2 can be lubricated for a long period, and the lifespan of the power transmission device 1 can be prevented from decreasing.

The cylindrical portion 6b of the support plate 6 is disposed outside the small-diameter portion 13b of the coupling 13. In other words, the small-diameter portion 13b of the coupling 13 is inserted into the hole 27 of the support plate 6. Disposing the cylindrical portion 6b outside the small-diameter portion 13b can reduce the tilt of the support plate 6, that is, the gradient thereof with respect to a line orthogonal to the axial line.

Free movement of the support plate 6 in the axial direction is restricted by the planetary rollers 4 and a step portion 13c of the coupling 13 that rotates integrally with the sun shaft 3. Because the sun shaft 3 is press-fitted into the hole 15 of the coupling 13, the coupling 13 rotates integrally with the sun shaft 3. Thus, the support plate 6 provided on the outer periphery of the coupling 13 with a small clearance interposed therebetween can come into contact with the outer periphery of the coupling 13 and rotate relatively to the sun shaft 3 in conjunction with rotation of the coupling 13, that is, in conjunction with rotation of the sun shaft 3.

To the support shafts 28 of the support plate 6, oil-containing rollers 29 that are oil-containing members are rotatably provided. Each oil-containing roller 29 is produced by mixing thermoplastic resin such as ultra-high molecular weight polyethylene, nylon, or polypropylene with lubricating oil having a high traction coefficient such as naphthenic mineral oil or silicone oil, heating this mixture up to a melting temperature of the resin, cooling the mixture for solidification, and forming the resulting solid in a cylindrical shape. Each oil-containing roller 29 is impregnated with the lubricating oil through small holes inside the oil-containing roller 29. The oil-containing roller 29 can be produced also by compression-molding synthetic resin powder and lubricant powder.

In the present embodiment, as depicted in FIG. 3, a clearance (first clearance) C1 between an inner periphery of the hole 27 of the support plate 6, that is, an inner periphery of the cylindrical portion 6b of the support plate 6 and an outer periphery of the small-diameter portion 13b of the coupling 13 is set to be equal to or smaller than a clearance (second clearance) C2 between an inner periphery of the stationary ring 2 and an outer periphery of each oil-containing roller 29. Accordingly, even if misalignment has occurred during assembly of the device, the inner periphery of the cylindrical portion 6b comes into contact with the outer periphery of the small-diameter portion 13b before the outer periphery of the oil-containing roller 29 comes into contact with the inner periphery of the stationary ring 2. This can prevent the oil-containing roller 29 from coming into contact with the stationary ring 2 and being caught by the stationary ring 2. The size of the first clearance C1 is not particularly limited in the present invention, and is normally one millimeter or smaller, for example.

In the present embodiment, a clearance (third clearance) C3 between an outer periphery of the support plate 6, that is, an outer periphery 6c1 of the protruding wall 6c and the inner periphery 10a of one of the loose ribs 10 is set to be larger than the first clearance C1 and to be equal to or smaller than the first clearance+2 mm. The clearance (third clearance) C3 between the outer periphery 6c1 of the protruding wall 6c and the inner periphery 10a of the loose rib 10 is set to be larger than the clearance (first clearance) C1 between the inner periphery of the cylindrical portion 6b of the support plate 6 and the outer periphery of the small-diameter portion 13b of the coupling 13. This can prevent the support plate 6 from coming into contact with the loose rib 10 and generating abnormal noise, for example, during driving operation. By setting the third clearance C3 to be equal to or smaller than the first clearance+2 mm, it is possible to prevent or reduce leakage of grease in the planetary rollers 4 outside through the third clearance. This enables grease to be retained in the device for a longer period, and thus the lifespan of the power transmission device 1 can be prevented from decreasing.

In the power transmission device 1 described above, free movement of the support plate 6 in the axial direction is restricted by the planetary rollers 4 and the coupling 13 that is integrated with the sun shaft 3 so as to be integrally rotatable therewith. Specifically, free movement of the support plate 6 in the axial direction is restricted not on the carrier 5 side but on the sun shaft 3 side. The support plate 6 does not come into contact with the carrier 5 that rotates in the same phase as that of revolution of the planetary rollers 4. The support plate 6 comes into contact with the coupling 13 the rotational speed of which is different from that of the planetary rollers 4, thereby rotating in conjunction with rotation of the coupling 13. Specifically, the support plate 6 rotates relatively to the sun shaft 3 in conjunction with rotation of the sun shaft 3. Thus, the support plate 6 does not adhere to the carrier 5 and rotate in synchronization with the carrier 5, unlike in the conventional device. This allows the oil-containing rollers 29 to be continuously in contact with the planetary rollers 4, thereby enabling oil to be reliably supplied to the planetary rollers 4. Accordingly, oil can be supplied to rolling contact surfaces of the stationary ring 2 and the planetary rollers 4, and thus seizure of the rolling contact surfaces due to lack of oil can be prevented. Consequently, the lifespan of the power transmission device 1 can be increased.

Figure 5:
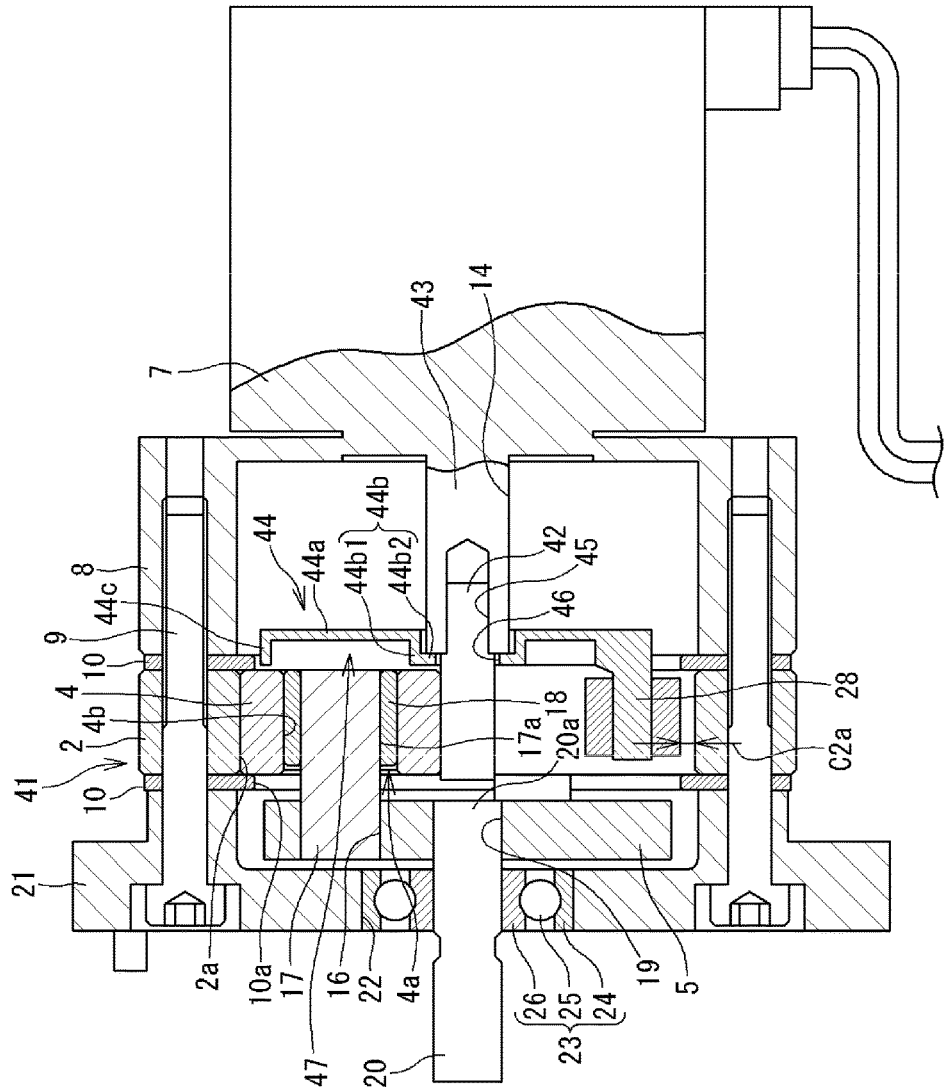
FIG. 5 is a sectional explanatory view of a power transmission device according to another embodiment of the present invention.
Figure 6:
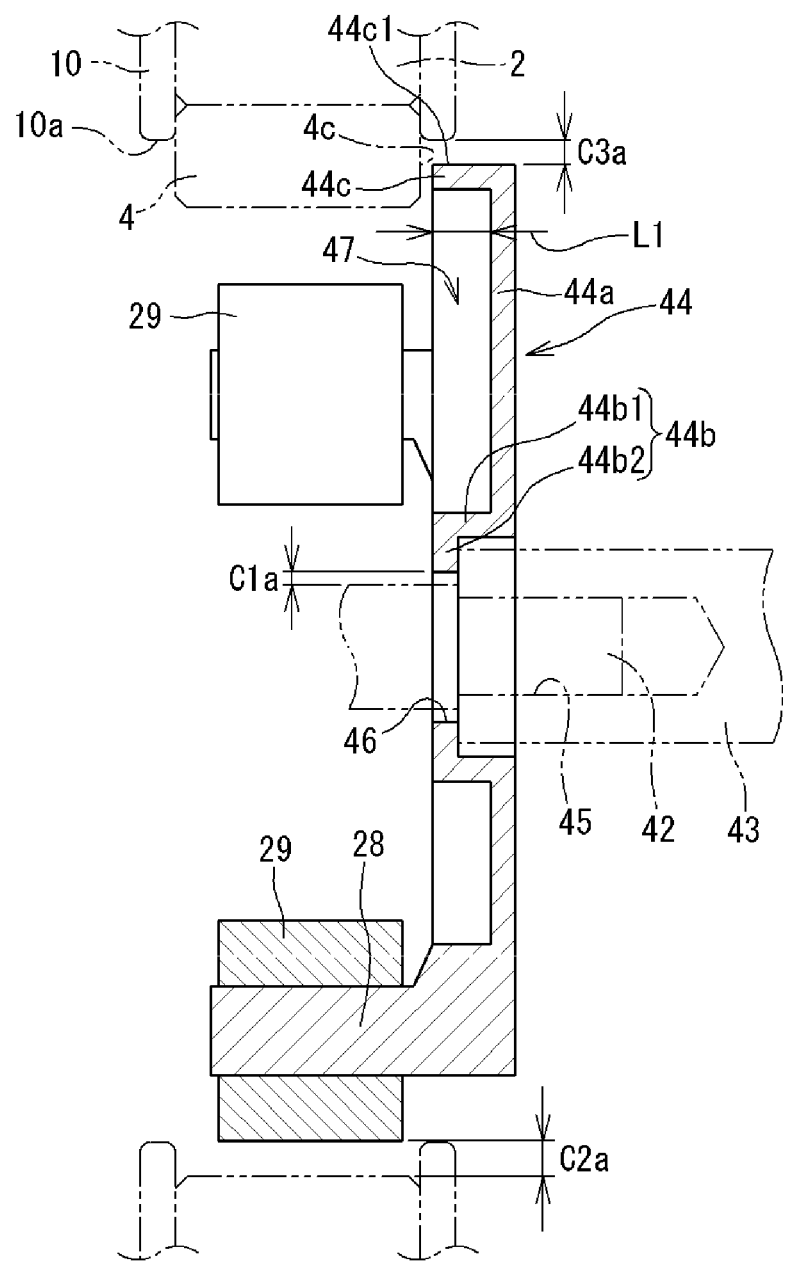
FIG. 6 is a side view of a support plate to which oil-containing rollers are provided.
Figure 7:
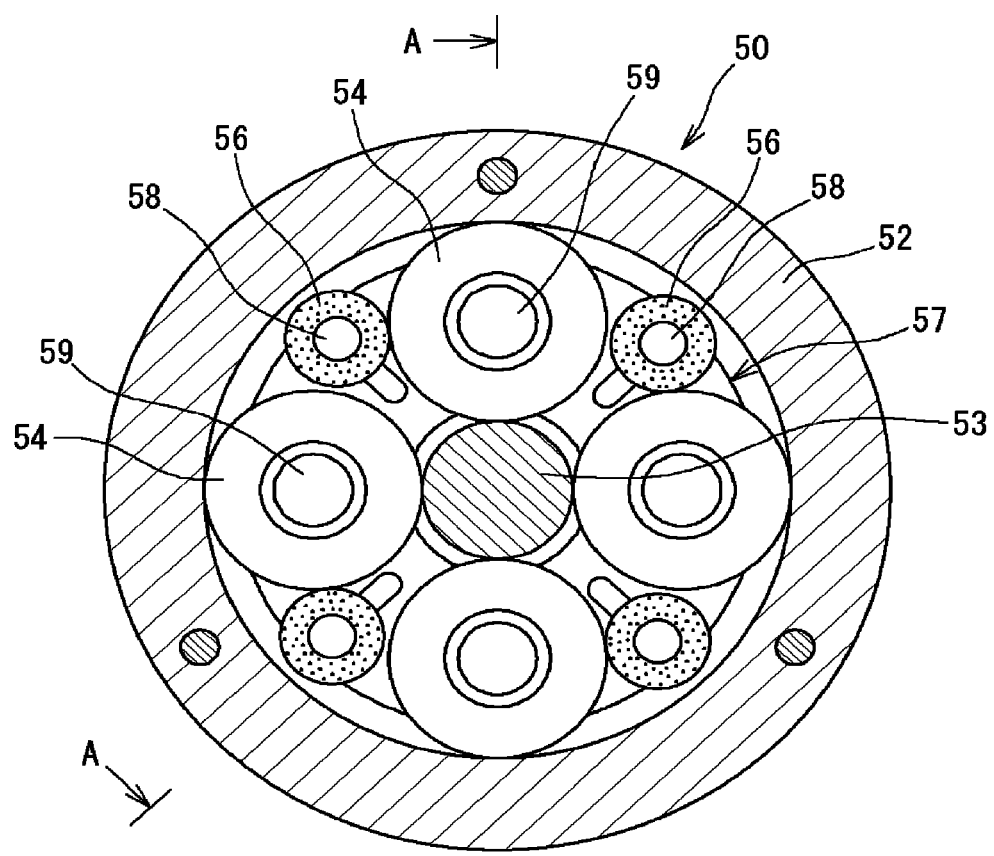
FIG. 7 is a vertical sectional view of a conventional power transmission device.
Figure 8:
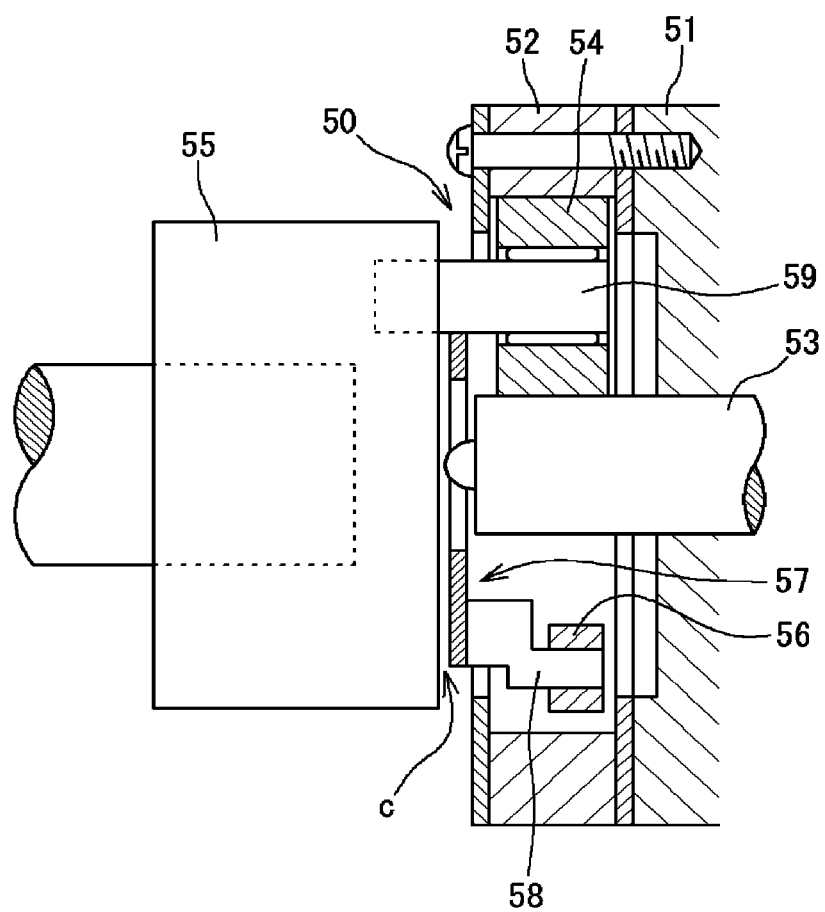
FIG. 8 is a sectional view of the power transmission device depicted in FIG. 7 along line A-A.
Figure 9:
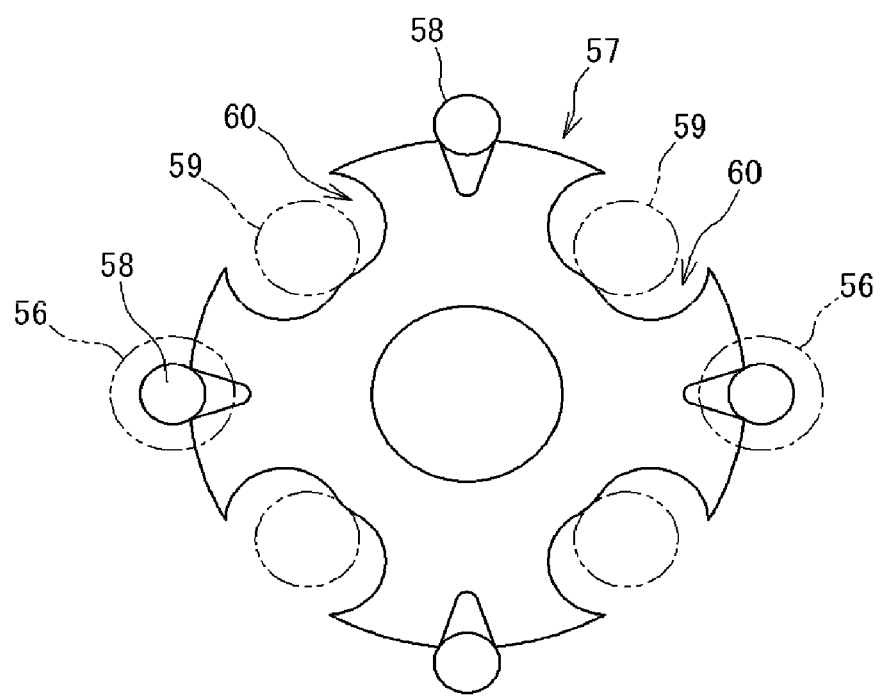
FIG. 9 is a front view of a support plate in the power transmission device depicted in FIG. 7.
Figure 10:
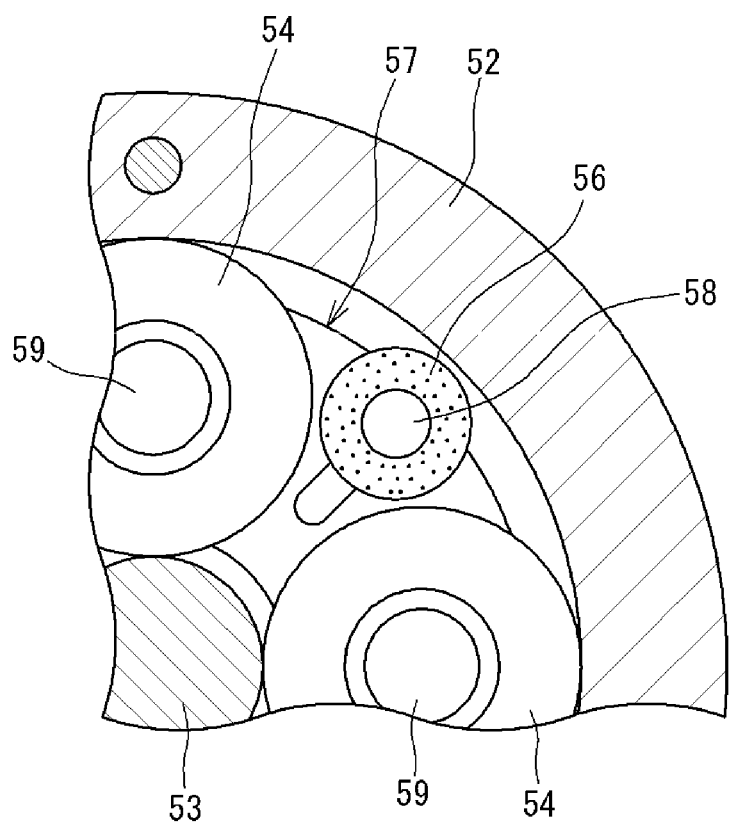
FIG. 10 is a partial vertical sectional view for explaining a non-contact state between oil-containing rollers and planetary rollers.

FIG. 5 is a sectional explanatory view of a power transmission device 41 according to another embodiment of the present invention. FIG. 6 is a side view of a support plate to which the oil-containing rollers are provided. The power transmission device 41 depicted in FIG. 5 is different from the power transmission device 1 depicted in FIGS. 1 to 4 in that a coupling is not used, and a sun shaft 42 is directly press-fitted into a motor shaft 43. This support plate 44 is different in shape from the support plate 6 of the power transmission device 1. Other than these, the structure of planetary rollers, for example, is the same as that of the power transmission device 1. Thus, the same elements as those of the power transmission device 1 are denoted by the same numerals, and the description thereof is omitted for simplicity.

The sun shaft 42 is press-fitted into a hole 45 formed in the motor shaft 43. Accordingly, the sun shaft 42 rotates in synchronization with rotation of the motor shaft 43. In the present embodiment, the coupling 13 of the power transmission device 1 is not used. Thus, the power transmission device 41 can directly transmit rotation of the motor shaft 43 to the sun shaft 42, and the number of components can be reduced in comparison with the power transmission device 1.

The support plate 44 includes a main body 44a, a projecting portion 44b, and an annular protruding wall 44c. The projecting portion 44b is formed in the center of the main body 44a. The protruding wall 44c protrudes from an outer peripheral edge of the main body 44a toward the other side (left side in FIG. 5) in the axial direction. The projecting portion 44b includes a short cylindrical sidewall 44b1 and a disk-shaped ceiling wall 44b2. In the center of the ceiling wall 44b2, a central hole 46 into which the sun shaft 42 can be inserted is formed. On peripheral portions of a surface of the support plate 44 on the other side in the axial direction, the support shafts 28 that support the oil-containing rollers 29 so that the oil-containing rollers 29 are rotatable are formed, protruding along the axial direction.

The protruding length L1 of the protruding wall 44c in the axial direction is set so that the protruding wall 44c can come into contact with the end surface 4c of each planetary roller 4. The protruding wall 44c is formed on the outer peripheral edge of the main body 44a, whereby a grease sump 47 that is similar to the grease sump 30 depicted in FIG. 2 can be formed on a side surface of the support plate 44 closer to the planetary roller 4. By providing this grease sump 47, grease can be retained in the device. This enables grease sticking to the grease sump 47 to be returned to the planetary rollers 4.

In the present embodiment also, clearances are formed between the support plate 44 and the sun shaft 42 and between the support plate 44 and one of the loose ribs 10 from the viewpoint of preventing abnormal noise, for example. Specifically, a clearance (first clearance) C1a between an inner periphery of the central hole 46 of the support plate 44 and an outer periphery of the sun shaft 42 is set to be equal to or smaller than a clearance (second clearance) C2a between the inner periphery of the stationary ring 2 and the outer periphery of each oil-containing roller 29. Accordingly, even if misalignment has occurred during assembly of the device, the inner periphery of the central hole 46 comes into contact with the outer periphery of the sun shaft 42 before the outer periphery of the oil-containing roller 29 comes into contact with the inner periphery of the stationary ring 2. This can prevent the oil-containing roller 29 from coming into contact with the stationary ring 2 and being caught by the stationary ring 2. When the clearance between an inner peripheral surface of the sidewall 44b1 of the projecting portion 44b and an outer periphery of the motor shaft 43 is assumed to be the first clearance, the first clearance can be set to be equal to or smaller than the second clearance. However, because dimensional accuracy of the sun shaft 42 is generally higher than that of the motor shaft 43, the clearance with respect to the sun shaft 42 is preferably used as a clearance for positioning.

A clearance (third clearance) C3a between an outer periphery 44c1 of the protruding wall 44c of the support plate 44 and the inner periphery 10a of one of the loose ribs 10 is set to be larger than the first clearance C1a and to be equal to or smaller than the first clearance+2 mm. The third clearance C3a is set to be larger than the first clearance C1a, which can prevent the support plate 44 from coming into contact with the loose rib 10 and generating abnormal noise, for example, during driving operation. The third clearance C3a is set to be equal to or smaller than the first clearance+2 mm. This can prevent or reduce leakage of grease in the planetary rollers 4 outside through the third clearance C3a.

In the power transmission device 41, free movement of the support plate 44 in the axial direction is restricted not on the carrier 5 side but on the sun shaft 42 side in the same manner as in the power transmission device 1 depicted in FIGS. 1 to 4. The support plate 44 does not come into contact with the carrier 5 that rotates in the same phase as that of revolution of the planetary rollers 4. The support plate 44 comes into contact with the sun shaft 42 the rotational speed of which is different from that of the planetary rollers 4, thereby rotating relatively to the sun shaft 42 in conjunction with rotation of the sun shaft 42. Thus, unlike in the conventional device, the support plate 44 does not adhere to the carrier 5 and rotate in synchronization with the carrier 5. This allows the oil-containing rollers 29 to be continuously in contact with the planetary rollers 4, thereby enabling oil to be reliably supplied to the planetary rollers 4. Accordingly, oil can be supplied to the rolling contact surfaces of the stationary ring 2 and the planetary rollers 4, and thus seizure of the rolling contact surfaces due to lack of oil can be prevented. Consequently, the lifespan of the power transmission device 41 can be increased.

The present invention is not limited to the embodiments described above, and various modifications can be made within the scope of the claims. For example, in the embodiments described above, three planetary rollers are disposed around the sun shaft. However, the number of planetary rollers is not limited to a particular number in the present invention, and a different number of (e.g., four) planetary rollers may be disposed around the sun shaft.

In the embodiments described above, an oil-containing roller rotatably provided to the corresponding support shaft of the support plate is used as an oil-containing member. However, the oil-containing member in the present invention is not limited to this oil-containing roller. For example, a cylindrical oil-containing body that is fixed to the support plate may be used as long as the cylindrical oil-containing body can move in conjunction with motion of the support plate and can be in contact with a peripheral surface of the corresponding planetary roller. However, the oil-containing roller is advantageous in that oil can be efficiently supplied to the planetary roller because the oil can be supplied by using the entire outer peripheral surface of the oil-containing roller.

In the embodiment depicted in FIGS. 1 to 4, the coupling is used as a member that is integrated with the sun shaft to rotate integrally with the sun shaft. As depicted in FIG. 5, the motor shaft is also integrated with the sun shaft to rotate integrally with the sun shaft, and thus this motor shaft is included in the member.

With the power transmission devices of the present invention, oil can be stably supplied to the planetary rollers.

What is claimed is:

1. A planetary roller power transmission device comprising:
    a stationary ring;
    a sun shaft disposed inside the stationary ring so as to be concentric with the stationary ring;
    a plurality of planetary rollers provided between the stationary ring and the sun shaft so as to be pressed against the stationary ring and the sun shaft;
    a carrier that supports the planetary rollers so that the planetary rollers are rotatable and that rotates in conjunction with revolution of the planetary rollers; and
    a disk-shaped support plate that supports an oil-containing member configured to be in contact with a peripheral surface of each of the planetary rollers, wherein
    free movement of the support plate in an axial direction is restricted by the planetary rollers and the sun shaft or a member that is integrated with the sun shaft so as to be integrally rotatable, and the support plate is structured so as to be caused to rotate by the sun shaft due to contact between (i) the support plate and (ii) the sun shaft or the member.

2. The planetary roller power transmission device according to claim 1, wherein the support plate has a central hole through which the sun shaft or the member passes, and a first clearance, greater than zero, between an inner periphery of the central hole and an outer periphery of the sun shaft or the member is set to be equal to or smaller than a second clearance between an inner periphery of the stationary ring and the oil-containing member.

3. The planetary roller power transmission device according to claim 2, wherein loose ribs that guide the planetary rollers are respectively provided on the opposite sides of the stationary ring in the axial direction, and
    a third clearance between an outer periphery of the support plate and an inner periphery of one of the loose ribs is larger than the first clearance and is equal to or smaller than the first clearance+2 mm.

4. The planetary roller power transmission device according to claim 2, wherein an annular protruding wall that protrudes in the axial direction is formed on an outer peripheral edge of the support plate,
    protruding length of the protruding wall in the axial direction is set so that the protruding wall comes into contact with end surfaces of the planetary rollers, and
    on a side surface of the support plate closer to the planetary rollers, the protruding wall defines a grease sump that has a recessed shape and allows grease to be supplied to the end surfaces of the planetary rollers.

5. The planetary roller power transmission device according to claim 2, wherein on peripheral portions of the support plate, pins the number of which is the same as that of the planetary rollers are formed protruding in the axial direction, and
    the oil-containing member is an oil-containing roller that is rotatably supported by the pins.

6. The planetary roller power transmission device according to claim 1, wherein an annular protruding wall that protrudes in the axial direction is formed on an outer peripheral edge of the support plate,
    a protruding length of the protruding wall in the axial direction is set so that the protruding wall comes into contact with end surfaces of the planetary rollers, and
    on a side surface of the support plate closer to the planetary rollers, the protruding wall defines a grease sump that has a recessed shape and allows grease to be supplied to the end surfaces of the planetary rollers.

7. The planetary roller power transmission device according to claim 1, wherein on peripheral portions of the support plate, pins the number of which is the same as that of the planetary rollers are formed protruding in the axial direction, and
    the oil-containing member is an oil-containing roller that is rotatably supported by the pins.

\* \* \* \* \*